US008818381B2

(12) United States Patent  (10) Patent No.: US 8,818,381 B2
Van Phan et al.  (45) Date of Patent: Aug. 26, 2014

(54) OPERATION IN CASE OF RADIO LINK FAILURE

(75) Inventors: Vinh Van Phan, Oulu (FI); Ling Yu, Oulu (FI); Kari Veikko Horneman, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 143 days.

(21) Appl. No.: 13/389,292

(22) PCT Filed: Aug. 7, 2009

(86) PCT No.: PCT/EP2009/060278
§ 371 (c)(1),
(2), (4) Date: Feb. 7, 2012

(87) PCT Pub. No.: WO2011/015248
PCT Pub. Date: Feb. 10, 2011

(65) Prior Publication Data
US 2012/0142336 A1   Jun. 7, 2012

(51) Int. Cl.
*H04W 36/00* (2009.01)
*H04W 76/04* (2009.01)
(52) U.S. Cl.
CPC ........ *H04W 36/0033* (2013.01); *H04W 76/046* (2013.01)
USPC ............................ 455/444; 370/315; 370/322
(58) Field of Classification Search
USPC .................................. 455/444; 370/315, 322
See application file for complete search history.

(56) References Cited

U.S. PATENT DOCUMENTS

| 6,278,881 B1* | 8/2001 | Balck ............................ 455/444 |
| 2005/0221834 A1* | 10/2005 | Kangas et al. ............. 455/452.1 |
| 2008/0242292 A1 | 10/2008 | Koskela et al. |

FOREIGN PATENT DOCUMENTS

| EP | 1 995 981 A1 | 11/2008 |
| EP | 2 086 253 A1 | 8/2009 |
| WO | WO 2008/084394 A2 | 7/2008 |
| WO | WO 2009/075341 A1 | 6/2009 |

OTHER PUBLICATIONS

R2-072382, 3GPP TSG-RAN WG2 Meeting #58, Orlando, USA, Jun. 25-29, 2007, "Radio Link Failure Recovery", Nokia Siemens Networks, et al., 8 pgs.

* cited by examiner

*Primary Examiner* — Vladimir Magloire
(74) *Attorney, Agent, or Firm* — Harrington & Smith (57) ABSTRACT

Attempting recovery from an unexpected radio link failure. A backup user context is created for a terminal device served currently by a relay base station relaying a radio connection between the terminal device and fixed cellular network infrastructure including a fixed base station communicating with the relay base station, wherein the backup user context is prepared for use in case of an unexpected radio link failure. Upon detection of the radio link failure in a primary user context being used in the communication, the backup user context is applied before the terminal device enters an idle state as a result of the radio link failure.

25 Claims, 5 Drawing Sheets

OPERATION IN CASE OF RADIO LINK FAILURE

FIELD

The invention relates to the field of cellular radio telecommunications and, particularly, to recovery from a radio link failure in such a system.

BACKGROUND

Modern telecommunication systems provide a solid coverage area particularly in densely populated areas. However, any environment may include locations where the quality of a radio communication link between a serving base station and a terminal device communicating with the base station is poor because of buildings and/or other obstacles between the base station and the terminal device. When the terminal device enters such a location, the quality of the radio communication link drops suddenly, and the probability of disconnection increases. This is particularly annoying when a user of the terminal device is conducting a telephone call or is having another ongoing conversational or streaming connection, i.e. the terminal device is in a connected state. When the quality of the radio communication link drops below a tolerable level in the connected state, the terminal device may have to go to idle state and attempt a reconnection with the serving (or another) base station. In any case, the connection is lost.

When the drop in the quality of the radio communication link is slow, a cellular network can prepare for the drop by handing the terminal device over to another base station. However, there are several cases where the drop is so sudden that the serving base station does not have time to issue a handover command and, as a consequence, the call is dropped. Such may happen when a terminal device is served by an indoor base station and the user of the terminal device exits the building. As another example, the user may be travelling on a train equipped with a mobile (or nomadic) relay base station relaying connections between terminal devices in the train and the cellular network. When the user exits the train and the train doors close, the connection is suddenly lost.

BRIEF DESCRIPTION

According to an aspect of the present invention, there is provided a method as specified in claim 1.

According to another aspect of the present invention, there is provided an apparatus as specified in claim 11.

According to another aspect of the present invention, there is provided a terminal device of a cellular telecommunication system as specified in claim 22.

According to another aspect of the present invention, there is provided a base station of a cellular telecommunication system as specified in claim 23.

According to another aspect of the present invention, there is provided an apparatus as specified in claim 24.

According to yet another aspect of the present invention, there is provided a computer program product embodied on a computer readable distribution medium as specified in claim 25.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
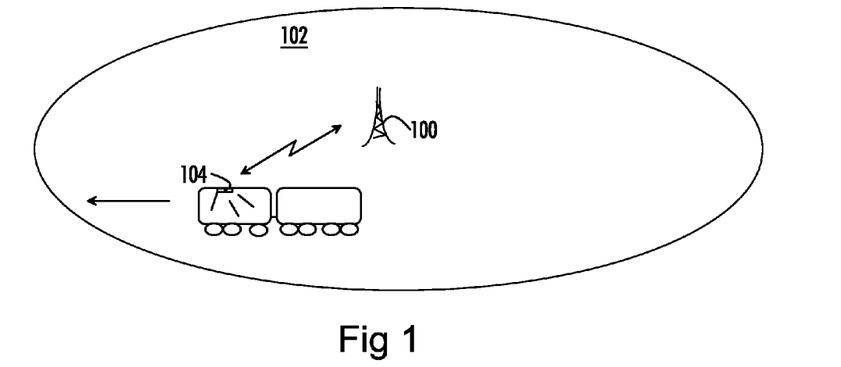
FIG. 1 illustrates an example of a communication environment between a mobile terminal and a mobile telecommunication system.

FIG. 1 illustrates an example of a communication environment between a mobile terminal and a mobile telecommunication system. In the illustrated scenario, a relay base station 104 is a mobile (or nomadic) base station installed to a train (or another mobile vehicle) and configured to relay cellular communication links between a cellular network and mobile terminals residing on the train. The mobile telecommunication system may be any mobile telecommunication system, e.g. any one of the evolution versions of UMTS (Universal Mobile Telecommunication System), GSM (Global System for Mobile communications) or another second generation system, or any other mobile telecommunication system.

Currently, the relay base station 104 is located in a cell 102 controlled by a fixed base station 100 but, as the train and the relay base station 104 move, the relay base station 104 is handed over to another fixed base station. As mentioned in the Background section, a sudden radio link failure may occur when a terminal device served by the relay base station 104 exits the train, the train doors close, and the train leaves. A conventional handover procedure may not be able to handle the situation, because even a control channel connection may be lost before a handover command has been issued. Then, the terminal device has to reestablish the connection via an idle state.

Figure 2:
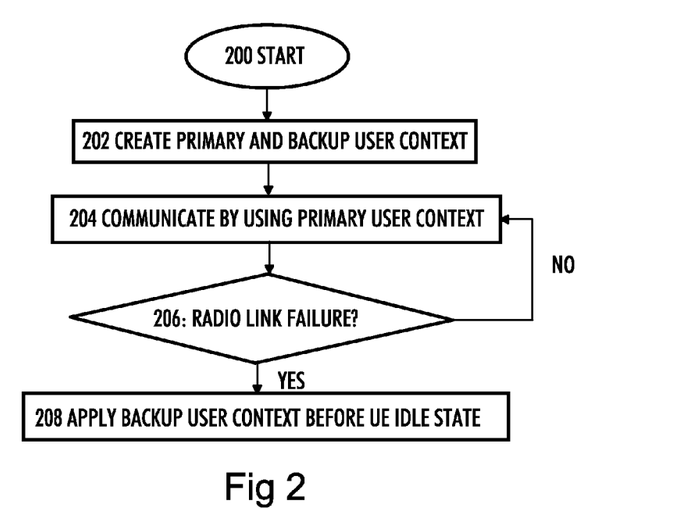
FIG. 2 illustrates a method for attempting a recovery from a radio link failure according to an embodiment of the invention.

FIG. 2 illustrates an embodiment of a procedure for attempting a recovery from a radio link failure. Let us assume that a communication scenario is the one illustrated in FIG. 1, where the terminal device (UE) is located on the train and is about to establish a radio connection with the cellular network through the relay base station 104 located on the train. First, the terminal device may deduce whether it is about to establish a radio connection with a relay base station or a fixed base station of the fixed cellular network. This may be deduced from an identifier of the relay base station 104, from a signal unique to the relay base stations and transmitted by the relay base stations in a broadcast or unicast/multicast manner, from a flexible spectrum utilization arrangement currently applied, and/or from a tracking area identifier used in, for example, in a long-term evolution (LTE) of the UMTS. The knowledge of whether the connection is to be established may be used in communication related to the establishment of the relayed connection.

The procedure starts in block 200. In block 202, the terminal device and the relay base station negotiate about the establishment of a radio connection. Step 202 includes creation of a primary user context in both the relay base station and the terminal device for use in the communication. The primary user context defines the communication parameters for the connection. Additionally, a backup user context is created for use in case of a sudden, unexpected radio link failure. Creation of the backup user context comprises informing a fixed base station currently communicating with the relay base station about the active connection established with the terminal device. The relay base station may request the serving fixed base station to create the backup user context in the fixed network part. The relay base station may also provide the fixed base station with at least an identifier, e.g. a cellular network temporary identifier (C-RNTI), of the terminal device so that the backup user context is associated with a correct terminal device. The backup user context may be created automatically and always when the terminal device either establishes a communication connection with a (mobile) relay base station or is handed over to the (mobile) relay base station. In other words, creation of the backup user context is different from creation of a user context in a handover target base station in the sense that the backup user context is created regardless of current channel states between the relay base station and the terminal device and between the fixed base station and the terminal device.

Furthermore, block 202 includes informing the terminal device about the identity of the fixed base station with which the relay base station currently communicates. The relay base station may indicate the identity of the fixed base station with which the relay base station currently communicates to terminal devices through dedicated or common control signaling. Common control signaling may include broadcasting the corresponding control information to the terminal devices. The relay base station may provide the terminal devices with a unique identifier of the fixed base station, and the terminal devices may receive and store the identifier of the fixed base station in the backup user context. The relay base station may also provide the terminal devices with other information related to communication with the fixed base station, e.g. carrier information indicating a frequency band allocated to the fixed base station. Provision of the carrier information facilitates execution of the backup context, because the terminal device is readily aware of the correct frequency band.

The terminal device also creates and stores the backup user context in block 202. The terminal device may store information on the serving fixed base station in the backup user context. Such information may comprise the at least part of the following information on the fixed base station: the identifier of the fixed base station, e.g. a physical layer L1 identifier or a global cell identifier, the carrier information of the fixed base station, a scheduling request configuration including scheduling request communication resources, periodicity (transmission timings of the scheduling requests), offset of the scheduling request, and timing advance information the relay base station uses in the communication with the fixed base station.

Figure 3A:
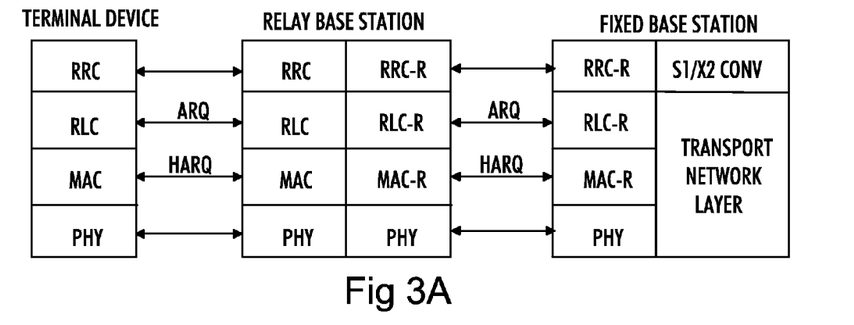
FIGS. 3A and 3B illustrate a control plane and a user plane protocol stacks for a configuration where a relay base station relays a communication link between the mobile terminal and the mobile telecommunication system.
Figure 3B:
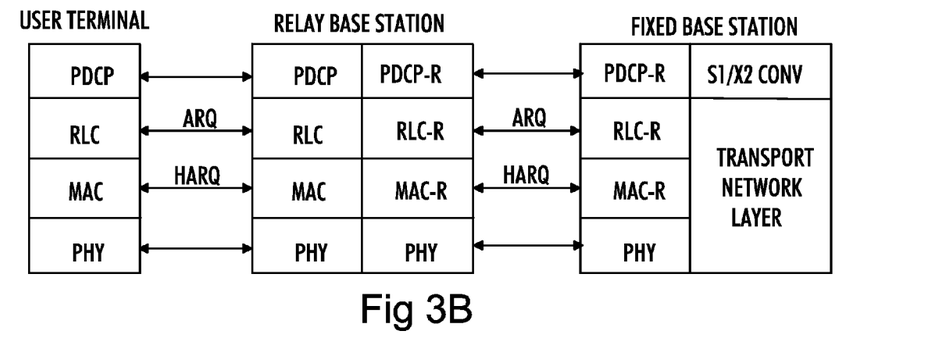

In block 204, the terminal device and the relay base station communicate with each other by using the primary user context created in block 202. The communication as such may be carried out in a conventional manner. Meanwhile, either the relay base station or the terminal device or both of them may monitor properties of the connection in order to determine the quality of the connection. The monitoring may be part of regular link adaptation, wherein a received signal power level is monitored. Particularly, the terminal device may monitor a reference signal broadcasted by the relay base station. The received signal power level may be compared with a preset threshold indicating whether the quality of the connection is above or below an acceptable level. Additionally, or alternatively, a bit error rate or other metrics indicating the connection quality may be monitored and used in determination of the connection quality. In block 206, the relay base station and/or the terminal device detect a possible radio link failure. The detection of the possible radio link failure in block 206 may be based on a sudden drop in the received signal power level below the threshold and/or incapability of receiving any or a particular signal from the other side of the connection. The detection of the possible radio link failure in block 206 may trigger initiation of a timer. If the signal power rises above the threshold and/or a signal is received from the other side of the connection before the expiry of the timer, the process returns to block 204. On the other hand, if the signal power remains below the threshold and/or no signal is received from the other side of the connection before the expiry of the timer, the process proceeds to block 208, wherein the backup user context is applied. In this case, the relay base station and/or the terminal device may communicate with the serving fixed base station about the initiation of the backup user context. When the backup user context has been established between the fixed base station and the terminal device, the relay base station and the terminal device release the primary user context, and the terminal device resumes the communication with the fixed base station over the backup user context. Advantageously, block 208 is executed and the backup user context is in use before the terminal device enters the idle state. Embodiments of the process of FIG. 2 can in principle be carried out in the terminal device, the relay base station, and the fixed base station, as will become apparent from signaling diagrams of FIGS. 6 to 8. The backup user context may be created in the terminal device, relay base station, and the fixed base station, and all these entities may carry out application of the backup user context upon detection of the radio link failure. Let us consider briefly communication in the case of relayed transmission, wherein the relay base station relays the communication between the terminal device and the cellular network, namely the fixed base station. The cellular network supports the relay extension and, possibly, also nomadic relay base stations that are mobile. FIG. 3A illustrates a control plane protocol stack for the relayed connection. Referring to FIG. 3A, the terminal device and the relay base station communicate in the control plane by using radio resource control (RRC), radio link control (RLC), medium access control, and physical layer signaling. A hybrid automatic repeat request (HARQ) scheme is in use in the MAC layer, and RLC layer implements a higher layer ARQ. This signaling mechanism is similar to a conventional control plane between the terminal device and the fixed base station. The support for the relay extension effectively implements the communication link between the relay base station and the fixed base station. An interface between the relay base station and the fixed base station is commonly known as X2 interface in 3GPP ($3^{rd}$ Generation Partnership Project) specifications. The X2 interface may be wired but, in case of a nomadic relay base station, the X2 interface is wireless, as the protocol stacks in FIGS. 3A and 3B illustrate. RRC, RLC, and MAC protocols between the relay base station and the fixed base station have functionality similar to that between the terminal device and the relay base station, but the protocols in the wireless X2 interface have been modified according to the relay extension. The fixed base station additionally includes conversion between an S1 signaling interface and the X2 interface to enable configuration of the relay base station through signaling over the S1 interface comprised between the base stations and other network control entities of the cellular network, e.g. a mobility management entity. Below the S1/X2 converter towards a cellular network, the fixed base station has transport network layer handling communication over wired connections. A user plane protocol stack illustrated in FIG. 3B has a similar structure, but the control plane RRC layer is obviously replaced by a packet data convergence protocol (PDCP) in the stack, as is known in the art.

Figure 4A:
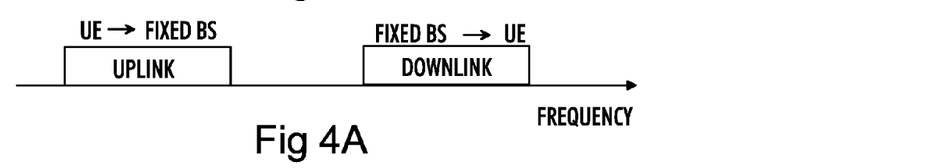
FIGS. 4A and 4B illustrate spectrum allocation for direct and relayed communication scenarios.
Figure 4B:
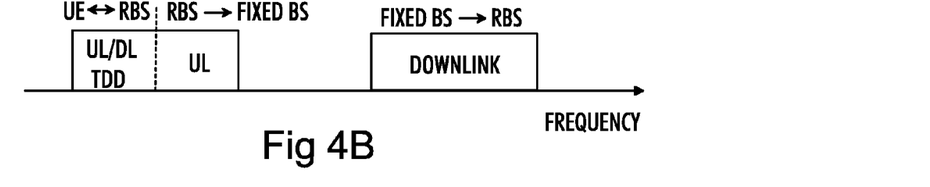
Figure 5:
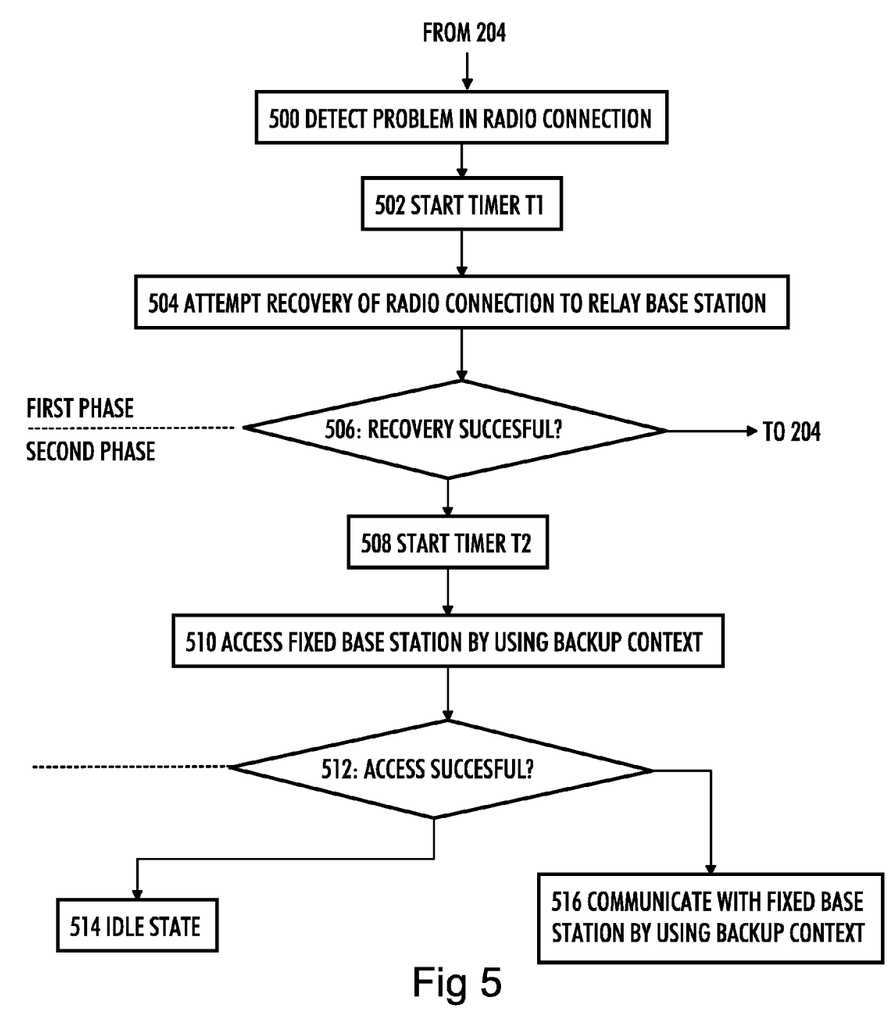
FIG. 5 illustrates a detailed procedure for attempting a recovery from the radio link failure.

FIG. 4A illustrates spectrum allocation in communication between a terminal device and a fixed base station, wherein uplink and downlink communications are separated in frequency, i.e. the communication is based on frequency-division duplexing (FDD). The fixed base station may support flexible spectrum use (FSU), which means that the frequency spectrum allocated to the fixed base station may vary in time and adapt to varying communication environments. As a consequence, the center frequencies and bandwidths of the uplink and/or downlink bands may be variable. FIG. 4B illustrates an example of spectrum allocation in case the fixed base station communicates with a nomadic relay base station relaying communication links between the fixed base station and terminal devices served by the nomadic base station. In this scenario, the nomadic base station and the fixed base station may utilize the same downlink frequency band allocated to the terminal devices in FIG. 4A. The uplink band of FIG. 4A may be divided into two portions: one for uplink communications between the nomadic base station and the fixed base station, and one for uplink and downlink communications between the nomadic base station and the terminal devices served by the nomadic base station. The nomadic base station and the terminal devices may communicate on that frequency band according to time or frequency division duplexing. The fixed base station may schedule its uplink communication resources to the nomadic base station for use both in uplink communications with the fixed base station and in uplink/downlink communications with the terminal devices. FIG. 5 illustrates a more detailed process of FIG. 2 for attempting a recovery from a radio link failure. The process is described from the terminal device point of view. Referring to FIG. 5, the process proceeds to block 500 from block 204. In block 500, a problem in the radio connection between the terminal device and the serving (mobile) relay base station is detected. The problem may be degradation of received signal power below the preset threshold level or incapability of receiving any or a given signal or message from the relay base station. In block 502, in response to the detection of the problem in the radio connection, the terminal device starts a first timer T1 counting a preset time. At the same time, the first phase of a radio recovery procedure is started. In the first phase, the terminal device may attempt the recovery of the radio connection to the relay base station. The terminal device may transmit a scheduling request indicator or another control channel message to the relay base station.

In block 506, a decision is made whether the attempted recovery has been successful in the first phase. Block 506 may be triggered by a successful recovery attempt in block 504 or expiry of the first timer T1 without reception of a signal from the relay base station or before the received signal level rises above the threshold. If block 506 is triggered by the successful recovery attempt in block 504, the process returns to block 204, and communication with the relay base station is resumed. On the other hand, if block 506 is triggered by the expiry of the first timer T1, it is determined that the first phase of the recovery procedure has not been successful, and the process proceeds to block 508 where a second timer T2 counting another preset time is started. At the same time the second phase of the recovery process is started.

In the second phase, the terminal device applies the backup user context and attempts to establish a connection to the fixed base station in block 510. The manner in which the terminal device attempts to access the fixed base station depends on what type of information is stored in the terminal device in connection with the backup user context. Preferably, the terminal device has knowledge of at least the identifier of the fixed base station so that it can synchronize to a signal broadcasted by the fixed base station. If the terminal device is aware of the carrier information of the fixed base station, the access is faster, because the terminal device can instantly adjust to an appropriate frequency band. If the backup user context stored in the terminal device comprises the scheduling request configuration and the timing advance information the relay base station used in the communication with the fixed base station before the radio link failure, the terminal device can try to access the fixed base station directly by sending a scheduling request by using the scheduling request configuration and the timing advance information to determine the appropriate scheduling request resources and the transmission timing. Alternatively, the terminal device may send another message indicating to the base station a request for applying the backup user context. In both cases, the terminal device can omit a random access procedure, and the recovery can be faster than with the random access procedure. If the terminal device does not store the scheduling request configuration and/or the timing advance information, the terminal device may access the fixed base station through the random access procedure on a random access channel. After successful establishment of the connection through the random access procedure, the terminal device may transmit the scheduling request or another message indicating the application of the backup user context.

In block 512, a decision is made whether the attempted recover has been successful in the second phase. Block 512 may be triggered by a successful or unsuccessful recovery attempt in block 510 or expiry of the second timer T2 without reception of a signal from the fixed base station. If block 512 is triggered by the successful recovery attempt in block 510, i.e. the user successfully applies the backup user context with the fixed base station, the process proceeds to block 516 where the terminal device resumes communication with the fixed base station and transfers data by using the backup user context. On the other hand if block 512 is triggered by an unsuccessful recovery attempt in block 510 because of reception of a rejection to apply the backup user context from the fixed base station, e.g. due to congestion in the fixed base station, the process proceeds to block 514 where the terminal device goes to idle state. Similarly, if block 512 is triggered by the expiry of the second timer, the process proceeds to block 514.

Figure 6:
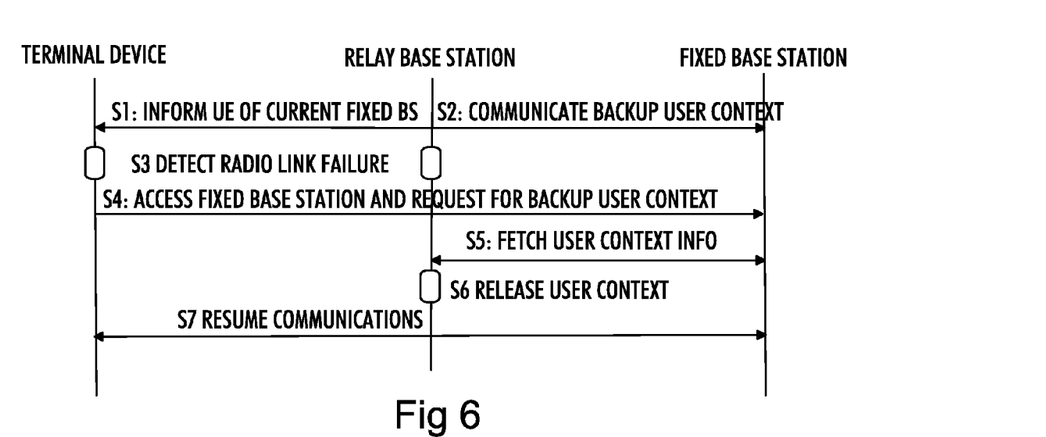
FIGS. 6 to 8 are signaling diagrams illustrating embodiments for recovery in case of the radio link failure.
Figure 7:
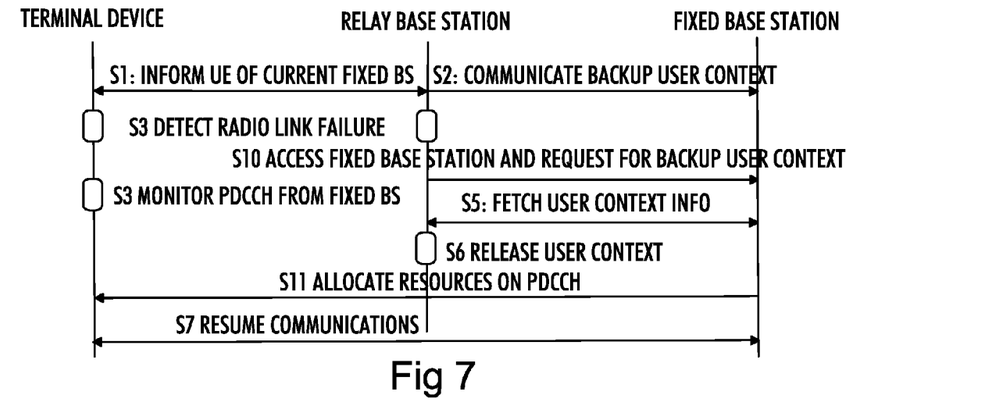
Figure 8:
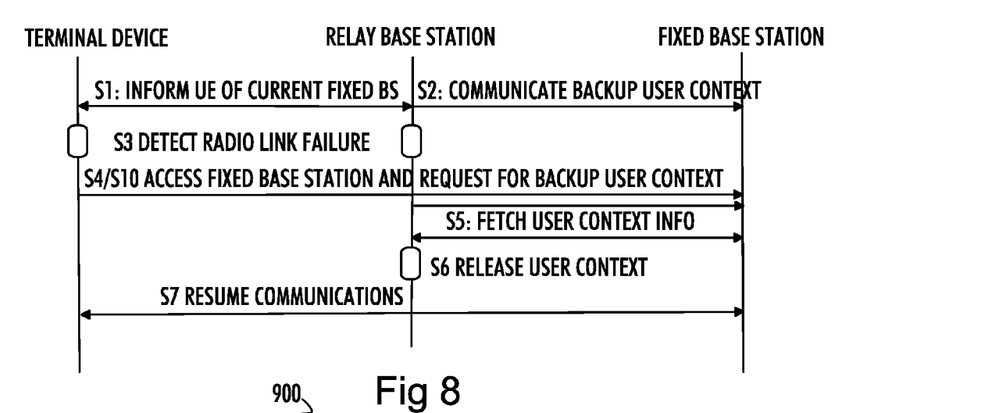

As mentioned above, creating and applying the backup user context may include functionalities in the terminal device, the relay base station and the fixed base station. FIGS. 6 to 8 illustrate signaling diagrams where the operation of each of these entities is described in connection with three embodiments for recovery from the radio link failure. Initial situation in FIGS. 6 to 8 is that the terminal device and the relay base station are establishing a relayed radio connection between the terminal device and the fixed cellular network through the fixed base station. The terminal device and the relay base station have already established the connection with a primary user context and have also created and stored the backup user context. Referring to FIG. 6, the relay base station informs in S1 the terminal device about the fixed base station with which it currently communicates. The relay base station may, for example, broadcast an identifier of the current fixed base station. Additionally, the relay base station may inform the UE about other communication parameters that may facilitate the recovery from the radio link failure. Such parameters may include the scheduling request configuration and the timing advance information the relay base station currently uses in communication with the fixed base station. The terminal device may then store the information received from the relay base station in S1 to its backup user context. S1 may be repeated as the information about current fixed base station changes, i.e. the information may be updated, and the terminal device may update its backup user context accordingly. The update may be needed when the relay base station is handed from one fixed base station to another and/or when the scheduling request configuration and/or the timing advance information changes.

In S2, the base station communicates the particulars of the created backup user context to the fixed base station. The particulars of the backup user context may include the identifier (C-RNTI) of the terminal device and/or a dedicated identifier assigned to the backup user context. As the relay base station is handed over to another fixed base station, S2 may be repeated or the source and target base stations of the handover may exchange the backup user context(s) so that the backup user contexts are constantly stored in the fixed base station closest to the relay base station. Alternatively, the backup user contexts may be stored in a dedicated memory storage in the fixed cellular network from where they can be retrieved upon occurrence of the radio link failure. Then, signaling the backup user contexts according to the mobility of the mobile relay base station will not be necessary.

In S3, a radio link failure is detected in communication between the relay base station and the terminal device. The radio link failure may be detected in the relay base station and/or in the terminal device. The radio link failure may be detected after the expiration of the first timer T1 mentioned above. The first time may be used in both the terminal device and the relay base station. Upon detection of the radio link failure, the terminal device attempts to access the fixed base station currently stored in the backup user context (S4). The terminal device may access the base station according to the information stored in the backup user context, i.e. through the random access procedure or the scheduling request configuration. At the same time, the terminal device starts the second timer T2 which may be called a recovery timer. At the same time, the relay base station may prepare to communicate with the fixed base station in relation to the recovery from the radio link failure of the terminal device. If the terminal device succeeds in accessing the fixed base station, the terminal device may indicate the occurrence of the radio link failure and request for initiating the backup user context. The terminal device may provide the fixed base station with the identifier of the backup user context and/or an identifier of the relay base station with which the radio link failure occurred.

If the fixed base station finds the backup user context of the terminal device, it may validate the backup user context initially and initiate a procedure for establishing the backup user context as a primary user context. This procedure may include a step where the fixed base station communicates with the relay base station stored in the backup user context and/or indicated by the terminal device and fetches and restores communication parameters needed for the reestablishment of the primary user context (S5). In S6, the relay base station releases the user context of the terminal device after completion of S5. In S6, the fixed base station has established the backup user context as the primary user context, and the terminal device may resume communications with the cellular network, now in direct communication with the fixed base station. In a successful recovery, S7 is executed before the expiry of the recovery timer T2, i.e. before the terminal device enters the idle state and the connection is lost.

The recovery procedure described above in connection with FIG. 6 is initiated by the terminal device by attempting to access the fixed base station upon detection of the radio link failure. FIG. 7 illustrates another embodiment where the relay base station initiates the recovery. Steps denoted by the same reference numerals in FIGS. 6 to 8 relate to the same or at least similar steps in different embodiments. Referring to FIG. 7, upon detection of the radio link failure, the relay base station accesses the fixed base station, e.g. over the X2 signaling interface, and requests the fixed base station to apply the backup user context for the terminal device. The relay base station may provide the fixed base station with the identifier of the terminal device and/or the identifier of the particular backup user context. At the same time, the terminal device may retrieve the information on the backup user context from its memory unit and prepare for the possible radio link recovery by tuning its receiver to the fixed base station and listening to a control channel transmitted by the fixed base station, e.g. a physical downlink control channel (PDCCH). The recovery timer may also be started in the terminal device. Upon reception the request for establishment of the backup user context of the terminal device as the primary user context, the fixed base station may carry out S5 as in the embodiment of FIG. 5. In S11, the fixed base station has established the parameters of the user context of the terminal device and allocates communication resources to the terminal device on the PDCCH, and so the communications between the terminal device and the cellular network may be resumed in S7.

An embodiment illustrated in FIG. 8 is in practice a combination of embodiments of FIGS. 6 and 7. In this embodiment, both the terminal device and the relay base station access the fixed base station in S4 and S10 upon detection of the radio link failure in S3. Both the terminal device and the relay base station may request for the application of the backup user context. In S5, the fixed base station and the relay base station exchange information necessary for transferring the user context from the relay base station to the fixed base station, and the relay base station releases the user context in S6. In S7, the terminal device resumes communication with the fixed base station.

Figure 9:
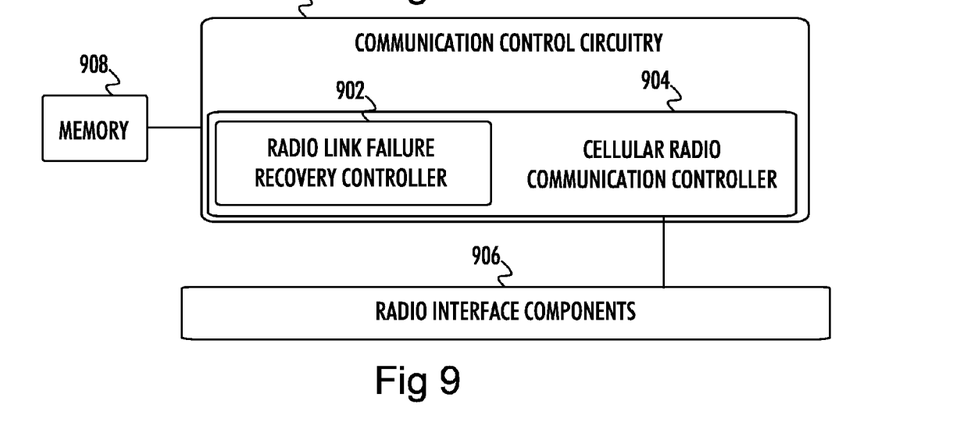
FIG. 9 is a block diagram illustrating functional elements of a terminal device according to an embodiment of the invention.
Figure 10:
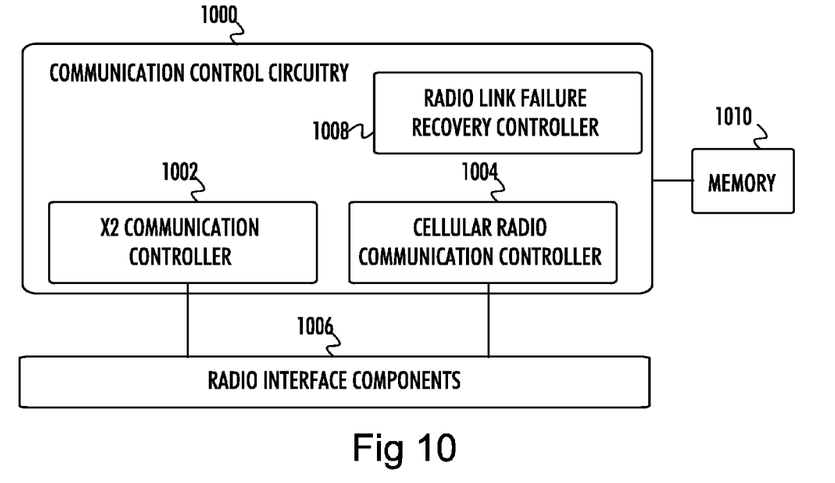
FIG. 10 is a block diagram illustrating functional elements of a relay base station of the mobile telecommunication system according to an embodiment of the invention.
Figure 11:
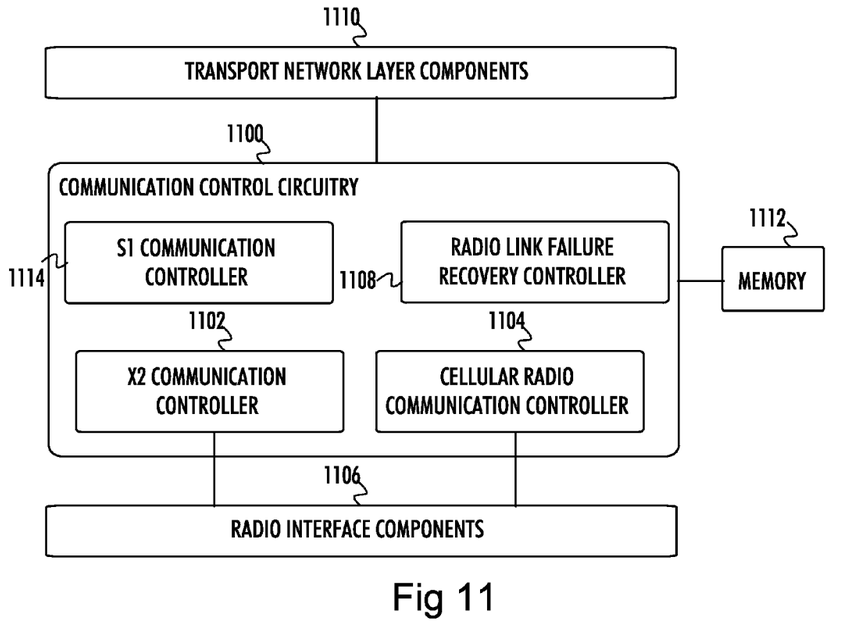
FIG. 11 is a block diagram illustrating functional elements of a fixed base station of the mobile telecommunication system according to an embodiment of the invention.

As becomes obvious from the above description, the recovery from the radio link failure includes functionalities in the terminal device, the relay base station, and the fixed base station. As a consequence, the terminal device, the relay base station, and the fixed base station all form different embodiments of an apparatus according to the invention. In practice, functionalities of the recovery from the radio link failure are executed in communication control circuitries in each of these elements. FIGS. 9 to 11 illustrate embodiments of such communication control circuitries, wherein the embodiment of FIG. 9 is applicable to the terminal device, the embodiment of FIG. 10 is applicable to the mobile relay base station, and the embodiment of FIG. 11 is applicable to the fixed base station of the fixed cellular network.

Referring to FIG. 9, the terminal device comprises radio interface components 906 handling physical layer signal processing necessary for communicating with the cellular network according to the specifications of the cellular network. The radio interface components 906 may carry out both digital and analog signal processing operations for signals transmitted from the terminal device and for signals received in the terminal device. The digital signal processing may include (de)modulation and (de)coding operations, among others. The analog operations may include amplification, frequency-conversion, filtering, etc.

A communication control circuitry 900 of the terminal device is configured to control the establishment, operation and termination of the radio connections in the terminal device. The communication control circuitry 900 may comprise cellular radio communication controller circuitry 904 configured to operate cellular radio communication links established with the cellular network through a fixed or a relay base station. The cellular radio communication controller circuitry 904 enables the terminal device to communicate with the cellular network, including fixed and relay base stations of the network, according to the specifications of the cellular network, e.g. UMTS LTE. The cellular radio communication control circuitry 904 comprises a radio link failure recovery controller 902 which can be seen as a sub-routine in the functionality of the cellular radio communication controller 904. The cellular radio communication controller 904 may create and store the backup user context in a memory unit 908 in connection with establishing a radio connection with a relay base station, update the backup user context during the normal operation of the terminal device. The cellular radio communication controller 904 may also monitor the quality of the connection and, upon detection of the radio link failure, the cellular radio communication controller 904 may call for the radio link failure recovery controller 902 which attempts to reestablish the connection by using the stored backup user context, as in the embodiments described above in connection with operation of the terminal device in case of the radio link failure.

The terminal device may be a cellular phone comprising other elements, such as a user interface including display unit, keypad or a keyboard, a speaker and a microphone. However, the terminal device may also be a cellular terminal dongle connectable to a computer for providing the computer with a cellular access.

Referring to FIG. 10, the relay base station comprises radio interface components 1006 handling physical layer signal processing necessary for communicating with the terminal devices and fixed base stations according to the specifications of the cellular network. The radio interface components 1006 may carry out both digital and analog signal processing operations for signals transmitted from the relay base station and for signals received in the relay base station.

Communication control circuitry 1000 of the relay base station is configured to control the establishment, operation and termination of the radio connections in the relay base station. The communication control circuitry 1000 may comprise cellular radio communication controller circuitry 1004 configured to operate cellular radio communication links established with the terminal devices. The cellular radio communication controller circuitry 1004 enables the relay base station to serve the terminal devices with relayed communication connections according to the specifications of the cellular network supporting the relay extension, e.g. UMTS LTE.

The communication control circuitry 1000 comprises also X2 communication controller circuitry 1002 configured to control the communication in the X2 interface between the relay base station and the fixed base station. In operation the X2 communication controller and the cellular radio communication controller exchange user data and control signals in order to operate the relayed connections.

The communication control circuitry 1000 further comprises a radio link failure recovery controller 1008. As described above in connection with FIG. 9, the cellular radio communication controller 1004 may create and store the backup user context in a memory unit 1010 in connection with establishing a radio connection with a given terminal device, update the backup user context during the normal operation of the radio connection. The memory unit 1010 may reside in the relay base station. The cellular radio communication controller 1004 may also monitor the quality of the connection and, upon detection of the radio link failure, the cellular radio communication controller 1004 may report the radio link failure to the communication control circuitry and call for the radio link failure recovery controller 1008 which attempts to reestablish the connection by using the stored backup user context, as in the embodiments described above in connection with operation of the relay base station in case of the radio link failure.

Referring to FIG. 11, the fixed base station comprises radio interface components 1106 handling physical layer signal processing necessary for communicating with the terminal devices and relay base stations according to the specifications of the cellular network. The radio interface components 1106 may carry out both digital and analog signal processing operations for signals transmitted from the fixed base station and for signals received in the fixed base station. The fixed base station may be a central base station having a direct connection to the other network elements in the fixed cellular network over an S1 interface or another corresponding connection. In order to enable the S1 interface connection and to route data to the other parts of the cellular network, the Internet, and to the other networks, the fixed base station includes transport network layer components 1110 configured to handle these connections by using IP (Internet protocol) connections, for example. Communication control circuitry 1100 of the fixed base station is configured to control the establishment, operation and termination of the radio connections and wired connections in the fixed base station. The communication control circuitry 1100 may comprise cellular radio communication controller circuitry 1104 configured to operate cellular radio communication links established directly with the terminal devices. The cellular radio communication controller circuitry 1004 enables the fixed base station to serve the terminal devices with relayed communication connections according to the specifications of the cellular network supporting the relay extension, e.g. UMTS LTE.

The communication control circuitry 1000 also comprises X2 communication controller circuitry 1002 configured to control the communication in the X2 interface between the relay base station and the fixed base station. In operation, the X2 communication controller controls the operation of the relay base station and exchanges user data of the terminal devices originating from or addressed to the terminal devices served by the relay base station(s) with which the fixed base station communicates through the radio interface components 1106. The X2 communication controller may receive information pertaining to a backup user context of a given terminal device from the relay base station. The X2 communication controller may store the backup user context in a memory unit 1112. The memory unit 1112 may reside in the fixed base station, and it may be accessed through a memory interface of the base station. Alternatively, the memory unit 1112 storing the backup user context may reside in another network element of the cellular network, in which case the S1 communication controller 1114 and the transport network layer 1110 may be used as an interface to the memory unit 1112. The X2 communication controller 1102 may also be configured to update the backup user contexts, for example when the relay base station is handed over from one fixed base station to another, the identifier of the new fixed base station is updated to the backup user context. Additionally, the backup user context may be deleted when the terminal device enters an idle state, or the terminal device may be denoted as idle in the backup user context, if the backup user context is not deleted. In the latter case, the backup user context may be retrieved upon creation of the backup user context the next time the terminal device transfers to a connected state and communicates through a relay base station. Basically, the backup user context in the network side may include up-to-date identifiers of the terminal device, the serving relay base station, and the serving fixed base station.

The communication control circuitry 1100 further comprises a radio link failure recovery controller 1108. The communication control circuitry may detect a radio link failure between the relay base station and the terminal device from the reception of the corresponding message through the X2 communication controller 1102 from the relay base station and/or through the cellular radio communication controller 1104 from the terminal device. The communication control circuitry 1100 may then call for the radio link failure recovery controller 1108 which attempts to reestablish the connection by retrieving the stored backup user context from the memory unit 1112 and by communicating with the relay base station and/or the terminal device, as in the embodiments described above in connection with operation of the fixed base station in case of the radio link failure.

The processes or methods described in FIGS. 2 to 5 and in signaling diagrams of FIGS. 6 to 8 may also be carried out in the form of a computer process or processes defined by a computer programs or programs. The computer program(s) may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program(s) may be executed in a single electronic digital processing unit or it may be distributed amongst a number of processing units.

The present invention is applicable to cellular or mobile telecommunication systems defined above but also to other suitable telecommunication systems. The procedure for recovering from the radio link failure may be applied to any system having a cellular structure, e.g. those involving macro, micro, pico, and/or femto cells, and to any type of radio access technology, even one supporting multiple radio access technologies. The cellular telecommunication system may have a fixed network infrastructure providing wireless services to terminal devices. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
creating a backup user context for a terminal device served currently by a relay base station, wherein the relay base station is a mobile relay base station, relaying a radio connection between the terminal device and fixed cellular network infrastructure comprising a fixed base station communicating with the relay base station, wherein the backup user context is prepared for use in case of an unexpected radio link failure, wherein an unexpected radio link failure is where a drop of the radio link is so sudden that the cellular network cannot prepare for the drop;
applying the backup user context upon detection of a radio link failure in a primary user context being used in the communication and before the terminal device enters an idle state as a result of the radio link failure; and
updating the backup user context when the mobile relay base station is handed over to another fixed base station of the fixed cellular network infrastructure.

2. The method of claim 1, wherein the terminal device applies the backup user context without reception of a command to apply the backup user context from the relay base station.

3. The method of claim 1, wherein the backup user context for the terminal device is created regardless of the channel state between the fixed base station and in the terminal device.

4. The method of claim 1, further comprising:
configuring the terminal device to store an identifier of the fixed base station in the backup user context stored in the terminal device; and
configuring the fixed base station to store an identifier of the terminal device in the backup user context stored in the fixed cellular network infrastructure.

5. The method of claim 1, further comprising:
accessing by the terminal device the fixed base station associated with the stored backup user context before entering the idle state and upon detection of the radio link failure in the terminal device; and
negotiating recovery of the radio link between the fixed network infrastructure and the terminal device by applying the backup user context as a primary user context.

6. The method of claim 1, further comprising:
exchanging information related to the primary user context between the relay base station and the fixed base station when applying the backup user context for use between the fixed base station and the terminal device.

7. The method of claim 1, further comprising:
negotiating, after detection of the radio link failure, release of the primary user context of the terminal device used in communication with the relay base station before the radio link failure.

8. An apparatus comprising:
at least one processor, and
at least one memory including computer program code,
wherein the at least one memory and the computer code are configured to, with the at least one processor, cause the apparatus to at least perform or control the following:

create of a backup user context for a terminal device served currently by a relay base station, wherein the relay base station is a mobile relay base station, relaying a radio connection between the terminal device and fixed cellular network infrastructure comprising a fixed base station communicating with the relay base station, wherein the backup user context is prepared for use in case of an unexpected radio link failure, wherein an unexpected radio link failure is where a drop of the radio link is so sudden that the cellular network cannot prepare for the drop;

apply the backup user context upon detection of a radio link failure in a primary user context being used in the communication and before the terminal device enters an idle state as a result of the radio link failure; and update the backup user context when the relay base station is handed over to another fixed base station of the fixed cellular network infrastructure.

9. The apparatus of claim 8, wherein the at least one memory and the computer code are further configured to, with the at least one processor, cause the apparatus to at least perform or control the terminal device to apply the backup user context without reception of a command to apply the backup user context from the relay base station.

10. The apparatus of claim 8, wherein the at least one memory and the computer code are further configured to, with the at least one processor, cause the apparatus to at least perform or control the creation of the backup user context for the terminal device regardless of the channel state between the fixed base station and in the terminal device.

11. The apparatus of claim 8, wherein at least one memory and the computer code are further configured to, with the at least one processor, cause the apparatus to at least perform or control accessing of the fixed base station associated with the stored backup user context before entering the idle state and upon detection of the radio link failure in the terminal device, and to negotiate the recovery of the radio link between the fixed network infrastructure and the terminal device by applying the backup user context as a primary user context.

12. The apparatus of claim 8, wherein the at least one memory and the computer code are further configured to, with the at least one processor, cause the apparatus to at least perform or control the exchanging of information related to the primary user context between the relay base station and the fixed base station when applying the backup user context for use between the fixed base station and the terminal device.

13. The apparatus of claim 8, wherein the at least one memory and the computer code are further configured to, with the at least one processor, cause the apparatus to at least perform or control the configuring of the terminal device to store an identifier of the fixed base station in the backup user context stored in the terminal device.

14. The apparatus of claim 8, wherein the at least one memory and the computer code are further configured to, with the at least one processor, cause the apparatus to at least perform or control the configuring of the fixed base station to store an identifier of the terminal device in the backup user context stored in the fixed cellular network infrastructure.

15. The apparatus of claim 8, wherein the at least one memory and the computer code are further configured to, with the at least one processor, cause the apparatus to at least perform or control the releasing of, after the detection of the radio link failure, the primary user context of the terminal device used in communication with the relay base station before the radio link failure.

16. A terminal device of a cellular telecommunication system, comprising the apparatus according to claim 8, a memory unit configured to store parameters pertaining to the backup user context, and radio interface components providing the terminal device with radio communication capabilities.

17. A base station of a cellular telecommunication system, comprising the apparatus according to claim 12, an interface to a memory unit storing the backup user context, and radio interface components to providing the base station with radio communication capabilities.

18. A computer program product embodied on a non-transitory computer-readable medium in which a computer program is stored comprising program instructions which, when loaded into an apparatus, execute the method according to claim 1.

19. A method, comprising:

creating a backup user context for a terminal device served currently by a relay base station relaying a radio connection between the terminal device and fixed cellular network infrastructure comprising a fixed base station communicating with the relay base station, wherein the backup user context is prepared for use in case of an unexpected radio link failure, wherein an unexpected radio link failure is where a drop of the radio link is so sudden that the cellular network cannot prepare for the drop;

applying the backup user context upon detection of a radio link failure in a primary user context being used in the communication and before the terminal device enters an idle state as a result of the radio link failure;

configuring the terminal device to store communication parameters to be used when the backup user context is applied, wherein the stored communication parameters include carrier information of the fixed base station, an identifier of the terminal device in the backup user context, a transmission timing advance used by the relay base station in communication with the fixed base station and a scheduling request configuration; and accessing the fixed base station by using the stored communication parameters upon detection of the radio link failure.

20. The method of claim 19, wherein the terminal device applies the backup user context without reception of a command to apply the backup user context from the relay base station.

21. The method of claim 19, wherein the backup user context for the terminal device is created regardless of the channel state between the fixed base station and in the terminal device.

22. A computer program product embodied on a non-transitory computer-readable medium in which a computer program is stored comprising program instructions which, when loaded into an apparatus, execute the method according to claim 19.

23. An apparatus comprising:

at least one processor, and at least one memory including computer program code, wherein the at least one memory and the computer code are configured to, with the at least one processor, cause the apparatus to at least perform or control the following:

create of a backup user context for a terminal device served currently by a relay base station relaying a radio connection between the terminal device and fixed cellular network infrastructure comprising a fixed base station communicating with the relay base station, wherein the backup user context is prepared for use in case of an unexpected radio link failure, wherein an unexpected radio link failure is where a drop of the radio link is so sudden that the cellular network cannot prepare for the drop;

apply the backup user context upon detection of a radio link failure in a primary user context being used in the communication and before the terminal device enters an idle state as a result of the radio link failure;

configure the terminal device to store communication parameters to be used when the backup user context is applied, wherein the stored communication parameters include carrier information of the fixed base station, an identifier of the terminal device in the backup user context, a scheduling request configuration and/or transmission timing advance used by the relay base station in communication with the fixed base station; and access the fixed base station by using the stored communication parameters upon detection of the radio link failure.

24. The apparatus of claim 23, wherein the at least one memory and the computer code are further configured to, with the at least one processor, cause the apparatus to at least perform or control the terminal device to apply the backup user context without reception of a command to apply the backup user context from the relay base station.

25. The apparatus of claim 23, wherein the at least one memory and the computer code are further configured to, with the at least one processor, cause the apparatus to at least perform or control the creation of the backup user context for the terminal device regardless of the channel state between the fixed base station and in the terminal device.

* * * * *